(12) United States Patent
Bobsin et al.

(10) Patent No.: US 12,141,860 B2
(45) Date of Patent: *Nov. 12, 2024

(54) SYSTEM AND METHOD FOR A FAST RENTAL APPLICATION

(71) Applicant: STATE FARM MUTUAL AUTOMOBILE INSURANCE COMPANY, Bloomington, IL (US)

(72) Inventors: Angela Rachelle Bobsin, Scottsdale, AZ (US); Abigail R. Wooden, Bloomington, IL (US); Troy Clark, Bloomington, IL (US); Matt Lawson, Chicago, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/214,826

(22) Filed: Jun. 27, 2023

(65) Prior Publication Data

US 2023/0342840 A1 Oct. 26, 2023

Related U.S. Application Data

(63) Continuation of application No. 17/861,703, filed on Jul. 11, 2022, now Pat. No. 11,769,196, which is a
(Continued)

(51) Int. Cl.
| | | |
|---|---|---|
| *G06Q 30/06* | (2023.01) | |
| *G06Q 30/0645* | (2023.01) | |
| *G06Q 50/16* | (2024.01) | |

(52) U.S. Cl.
CPC ......... *G06Q 30/0645* (2013.01); *G06Q 50/16* (2013.01)

(58) Field of Classification Search
CPC ................ G06Q 30/0645; G06Q 50/16
See application file for complete search history.

(56) References Cited

U.S. PATENT DOCUMENTS

| 2002/0123930 A1 | 9/2002 | Boyd et al. |
| 2002/0144153 A1 | 10/2002 | LeVine et al. |

(Continued)

FOREIGN PATENT DOCUMENTS

| CN | 103473100 A | * 12/2013 |
| CN | 103810616 A | * 5/2014 |

(Continued)

OTHER PUBLICATIONS

Umut Ozertem, "Learning to Suggest: A Machine Learning Framework for Ranking Query Suggestions", Aug. 2012, SIGIR'12, pp. 25-34. (Year: 2012).*

(Continued)

*Primary Examiner* — Tan D Nguyen
(74) *Attorney, Agent, or Firm* — MARSHALL, GERSTEIN & BORUN LLP

(57) ABSTRACT

The method, system, and computer-readable medium facilitate a fast rental application. A method may include receiving a login corresponding to a profile in a profile repository; receiving second data corresponding to the user associated with the profile from one or more search databases; automatically determining categories of a plurality of categories to which the second data belongs using a trained machine learning algorithm; retrieving the first data from one or more databases; generating updated user data corresponding to the user associated with the profile based upon at least the first data and the second data; storing at least the updated user data in the profile; and updating a rental application based on at least the updated user data.

20 Claims, 5 Drawing Sheets

Related U.S. Application Data continuation of application No. 14/994,336, filed on Jan. 13, 2016, now Pat. No. 11,410,225.

(60) Provisional application No. 62/102,921, filed on Jan. 13, 2015.

(56) References Cited

U.S. PATENT DOCUMENTS

| | | |
|---|---|---|
| 2002/0184062 A1 | 12/2002 | Diaz |
| 2003/0065555 A1 | 4/2003 | von Gonten et al. |
| 2003/0120614 A1 | 6/2003 | Shumpert |
| 2003/0130883 A1 | 7/2003 | Schroeder et al. |
| 2003/0208684 A1 | 11/2003 | Camacho et al. |
| 2003/0233296 A1 | 12/2003 | Wagner |
| 2004/0030640 A1 | 2/2004 | Mahnken et al. |
| 2005/0177420 A1 | 8/2005 | Tanahashi |
| 2005/0222861 A1 | 10/2005 | Silverman et al. |
| 2005/0234860 A1 | 10/2005 | Roever et al. |
| 2005/0251452 A1 | 11/2005 | Roever et al. |
| 2007/0038497 A1* | 2/2007 | Britti ............... H01L 23/49894 705/67 |
| 2007/0156429 A1* | 7/2007 | Godar .................. G06Q 30/06 705/5 |
| 2009/0124241 A1* | 5/2009 | Krishnaswamy ....... H04L 69/08 455/414.2 |
| 2010/0088313 A1 | 4/2010 | Hoffman et al. |
| 2010/0138037 A1 | 6/2010 | Adelberg et al. |
| 2012/0209839 A1* | 8/2012 | Andrews ............. H04W 4/029 707/E17.014 |
| 2013/0139229 A1 | 5/2013 | Fried et al. |
| 2013/0304822 A1* | 11/2013 | Tetreault .............. G06F 16/248 709/204 |
| 2014/0201126 A1 | 7/2014 | Zadeh et al. |
| 2014/0258243 A1* | 9/2014 | Bell ...................... H04L 67/306 707/690 |
| 2015/0151642 A1* | 6/2015 | Suzuki ................. G07F 15/005 705/5 |
| 2015/0169670 A1 | 6/2015 | Rosenberg |
| 2015/0294402 A1 | 10/2015 | Ingraham et al. |
| 2016/0086212 A1 | 3/2016 | Tietzen et al. |
| 2017/0270601 A1 | 9/2017 | Nakano |
| 2017/0323398 A1 | 11/2017 | Dintenfass et al. |
| 2017/0337569 A1 | 11/2017 | Sasson |

FOREIGN PATENT DOCUMENTS

| | | | | |
|---|---|---|---|---|
| CN | 106716460 A | 5/2017 | | |
| CN | 106796674 A | 5/2017 | | |
| CN | 107292721 A | 10/2017 | | |
| FR | 2867344 A1 | 9/2005 | | |
| KR | 2014-018498 | 2/2014 | | |
| KR | 2014018498 A | * 2/2014 | | |
| WO | WO-2012093773 A2 | * 7/2012 | ........... | G06F 3/0416 |
| WO | WO-2013/123482 A1 | 8/2013 | | |
| WO | WO-2014012445 A1 | * 1/2014 | ............... | G06F 8/61 |
| WO | WO-2014102445 A1 | 7/2014 | | |

OTHER PUBLICATIONS

Guy Shani, "An MDP-Based Recommender System", Journal of Machine Learning Research 6 (2005), pp. 1265-1295. (Year: 2005).*
C.P. Bezemer, "Enabling multi-tenancy: An industrial Experience report" 2010, IEEE, pp. 1-8. (Year: 2010).*
Lixin Tao, "Shifting Paradigms With The Application Service Provider Model," 2001, IEEE Explore, pp. 32-39 (Year: 2001).*
IP.IQ.com search. (Year: 2021).
Yanmei, Cheng, "Innovation Management Research of Public Rental House in China Based on Four-Three Structure," Nov. 1, 2013, 2013 6th ICIMIMIE, vol. 3, pp. 394-397, Abstract. (Year: 2013).
GooglePatentScholar Search. (Year: 2021).
Ginters, E, "Low cost augmented reality and RFID application for logistics items visualization", 2013, ScienceDirect, Procedia Computer Science 26 (2013) 3-13. (Year: 2013).
Borja Gamecho, "Automatic Generation of Tailored Accessible User Interface for Ubiquitous Services", Sep. 14, 2015, IEEE Transactions on Human-Machine Systems, vol. 45, Issue 5, pp. 612-623. Abstract. (Year: 2015).
Nicolas Viennot, "A Measurement Study of Google Play", 2014, SIGMETRICS'14, Jun. 16-20, 2014, pp. 1-14. (Year: 2014).
Krishna et al., "An ER Framework for e-contract Modeling, enactment and monitoring," 2004, Kata and Knowledge Engineering, 51, pp. 31-58, Apr. 9, 2004.
Ozertem et al., "Learning to Suggest: A Machine Learning Framework for Ranking Query Suggestions", Aug. 2012, SIGIR'12, pp. 25-34. (Year: 2012).
Shani et al., "An MDP-Based Recommender System", Journal of Machine Learning Research 6 (2005), pp. 1265-1295. (Year: 2005).

* cited by examiner

Rental History

| Address /252 | Deposit /254 | Fees /256 | Monthly Rent /258 | Dates /260 | Rating /262 |
|---|---|---|---|---|---|
| 123 Main | $500 | $250 | $500 | 1/1/2005 | 5/10 |
| 555 Lake | $200 | $100 | $750 | 1/1/2005 | 9/10 |

[ + ] — 268

Documents

[ LEASES ] /264   [ RECEIPTS ] /266   [ + ] /270

*FIG. 2B*

SYSTEM AND METHOD FOR A FAST RENTAL APPLICATION

CROSS-REFERENCE TO RELATED APPLICATIONS

This application is a continuation of and claims priority to and the benefit of the filing date of non-provisional U.S. patent application Ser. No. 17/861,703, entitled "SYSTEM AND METHOD FOR A FAST RENTAL APPLICATION," filed on Jul. 11, 2022, which is a continuation of and claims priority to and the benefit of the filing date of non-provisional U.S. patent application Ser. No. 14/994,336 entitled "SYSTEM AND METHOD FOR A FAST RENTAL APPLICATION," filed on Jan. 13, 2016, which in turn claims priority to and the benefit of the filing date of provisional U.S. Patent Application No. 62/102,921 entitled "SYSTEM AND METHOD FOR A FAST RENTAL APPLICATION," filed on Jan. 13, 2015. The entire contents of the related applications are hereby expressly incorporated herein by reference.

FIELD OF THE DISCLOSURE

This disclosure relates to a system and method to store and transfer pertinent personal information when applying for a home rental.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When applying to rent housing, a renter may need to provide a variety of personal information such as rental history, job history, references and other personal data. Providing such information can be cumbersome because a renter may not be able to remember all of the necessary information and because such information may not be easily accessible. In turn, an apartment search can become a chore, especially if each apartment rental application requires different information.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One embodiment of the techniques of this disclosure is a computer-implemented method for a fast rental application. The method may include receiving, at a backend server via a computer network, a login corresponding to a profile in a profile repository, wherein each profile includes first data corresponding to a user associated with the profile and a plurality of categories, and wherein the categories include at least personal information, rental history, and employment history; receiving, at the backend server by one or more processors, second data corresponding to the user associated with the profile from one or more search databases; automatically determining, at the backend server by one or more processors, categories of the plurality of categories to which the second data belongs using a trained machine learning algorithm; retrieving, at the backend server by one or more processors, the first data from one or more databases; generating, at the backend server by one or more processors, updated user data corresponding to the user associated with the profile based upon at least the first data and the second data, wherein generating the updated user data includes updating one or more categories of the plurality of categories based on the determined categories; storing, at the backend server, at least the updated user data in the profile; and updating, at the backend server, a rental application based on at least the updated user data.

In another embodiment of the disclosure a fast rental application system including a first client device corresponding to a user and a data server including one or more processors and one or more memories. The one or more memories may include instructions executed on the one or more processors to: receive, from the first client device via a computer network, a login corresponding to a profile in a profile repository, wherein each profile includes first data corresponding to a user associated with the profile and a plurality of categories, and wherein the categories include at least personal information, rental history, and employment history; automatically determine categories of the plurality of categories to which the second data belongs using a trained machine learning algorithm; retrieve the first data from one or more databases; generate updated user data corresponding to the user associated with the profile based upon at least the first data and the second data, wherein generating the updated user data includes updating one or more categories of the plurality of categories based on the determined categories; store, at the data server, at least the updated user data in the profile; and update, at the data server, a rental application based on at least the updated user data.

In yet another embodiment of the disclosure a non-transitory, computer-readable medium stores instructions that specifically configure one or more processors of a computer system. When executed by one or more processors, the instructions cause the computer system to: receive a login corresponding to a profile in a profile repository, wherein each profile includes first data corresponding to a user associated with the profile and a plurality of categories, and wherein the categories include at least personal information, rental history, and employment history; receive second data corresponding to the user associated with the profile from one or more search databases; automatically determine categories of the plurality of categories to which the second data belongs using a trained machine learning algorithm; retrieve the first data from one or more databases; generate updated user data corresponding to the user associated with the profile based upon at least the first data and the second data, wherein generating the updated user data includes updating one or more categories of the plurality of categories based on the determined categories; store at least the updated user data in the profile; and update a rental application based on at least the updated user data.

Advantages will become more apparent to those skilled in the art from the following description of the preferred embodiments which have been shown and described by way of illustration. As will be realized, the present embodiments may be capable of other and different embodiments, and their details are capable of modification in various respects.

Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIG. 2b is an illustration of an example user interface for a rental history page of the fast rental application;

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Many young urban dwellers move often as their education, careers, and relationships evolve. With frequent moves, it can be difficult for renters to keep track of all the information needed to fill out an application for a home or apartment rental. A "fast rental application" (fast app) can provide an easy to maintain database of personal information that can be shared in lieu of a rental application.

A renter using a fast app can store personal information such as demographic and personal information, preferences, rental history, employment history, credit history, insurance history, references and any other data that might be relevant to a rental application. The renter can also store pictures or scanned images of documents such as a lease agreement, pay stub, identification card, etc. By maintaining the information in the fast app, a renter will have a convenient way to share relevant personal data. The fast app will also be helpful to property managers by providing a convenient system for storing information related to properties and receiving rental applications.

Figure 1:
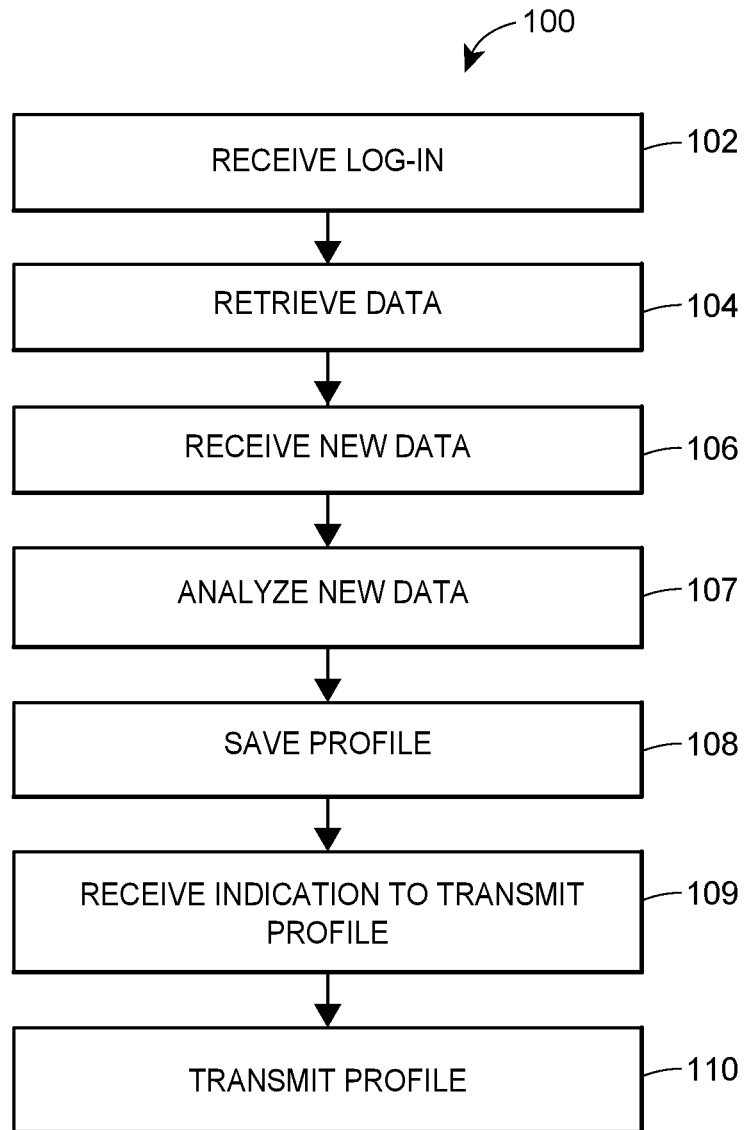
FIG. 1 is a flowchart illustrating an exemplary method for a fast rental application.

With reference to FIG. 1, a method 100 may be employed by a fast app system. The method 100 may include one or more functions or routines in the form of non-transitory computer-executable instructions that are stored in a tangible computer-readable storage medium and executed using a processor of a computing device (e.g. the clients 436-446, the server 420, or any combination of computing devices within the system 400 described below). The routines may be included as part of any of the modules described in relation to FIG. 4 below, or as part of a module that is external to the system illustrated by FIG. 4. For example, the method 100 may be part of a browser application or another application running on the clients 436-446 as a plugin or other module of the browser application.

Figure 4:
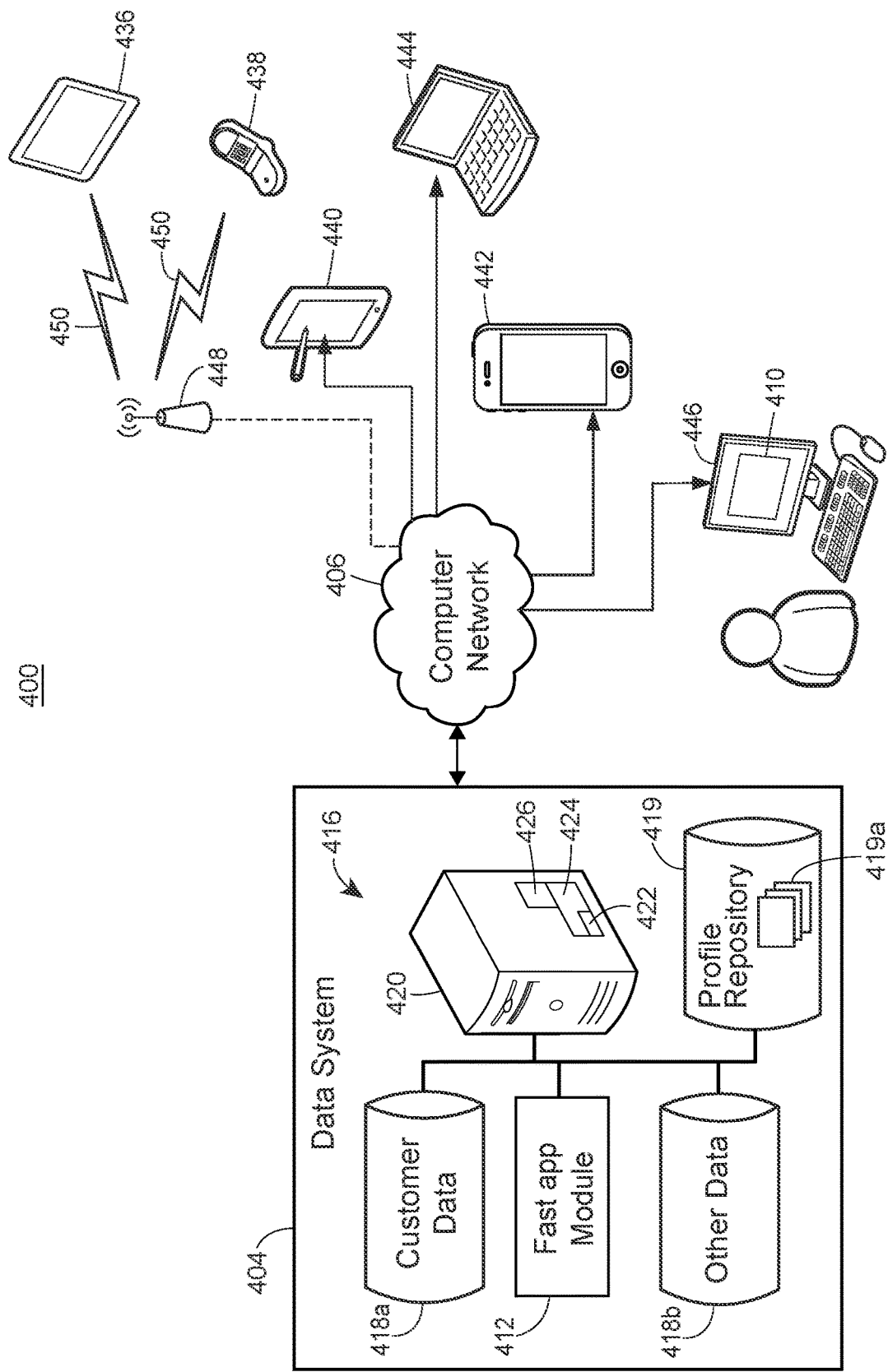
FIG. 4 is a simplified and exemplary block diagram of a system for a fast rental application.

The method 100 may begin by receiving a login (Block 102). If a login does not exist, a login may be created to correspond to a particular profile. In an embodiment, the system may receive a unique login ID and password to access a profile. In another embodiment the user of the system may implement a fingerprint scanner, an ID scanner or a magnetic swipe card to login to the system. Referring to FIG. 4 below, a fast app module 412 can be used to store login credentials and associate the login with a profile 419a from the profile repository 419.

In an embodiment, all profiles 419a in the profile repository 419 are associated with customers (policyholders) of an insurance provider. In another embodiment, profiles 419a in the repository 419 are associated to registered renters and/or property managers which do not have to be customers of the insurance provider. The data associated with a profile 419a will be discussed in greater detail below with respect to FIGS. 2a-3b.

After identifying a profile, the system may then retrieve data corresponding to the profile (Block 104). The module 412 may search available databases to retrieve data corresponding to an individual identified in the profile. In an embodiment, the module may be authorized to search databases provided by an insurance company, a rental agency, a government, a credit bureau or any other entity that stores pertinent data for a renter and/or property manager.

The system may then receive new data corresponding to the profile (Block 106). The new data received by the system can be used to complete a profile that was incomplete based on the retrieved information. The system can receive new data through inputs from a client device (such as client devices 436-446 from FIG. 4 below). For example, the module can receive text, photos, images, sound clips or other media to complete a profile. In an embodiment, the module can provide a questionnaire to receive new data necessary to complete a profile. In another embodiment, the module may receive scanned images or photos of documents (a residential lease, a paystub, a transcript, etc.) to be saved as part of the profile.

The received new data may then be analyzed by the module 412 (Block 107). The fast app module 412 may implement a variety of techniques to analyze the received new data. For example, the module 412 may implement optical character recognition techniques to extract data from an image received from a client device. In another embodiment, the module 412 may implement computer speech recognition techniques to extract data from received sound clips. In still another embodiment, the module 412 may implement QR code scanning or bar-code scanning techniques to extract data from media received above in Block 106. The above techniques are intended as examples of techniques that can be implemented by the module 412, and are not intended to be limiting. Any existing or future computer-implemented techniques to appropriately analyze media and extract data can be implemented by the module 412.

As the data is analyzed, the module 412 may begin to categorize the data. For example, the module may determine that an address was received and categorize the information under the rental history category. In another example, the module 412 may determine that the received media is related to an insurance bill and thus the data should be stored under an insurance history category. The module may implement various machine learning techniques to continually improve the methods by which received new data is analyzed and categories are determined.

Further, the data may be analyzed to verify accuracy. For example, the module 412 may access various databases to the cross check information from the received new data. Further, the module 412 may analyze the received new data to check if the received new data pertains to the current profile. For example, if an image of a document is received, the module 412 can scan for names, account numbers, etc. to ensure that the document is related to the renter corresponding to the profile. Received new data may not be accepted if it is not verified.

Once the received new data is analyzed, the system may store the retrieved data and received new data in the appropriate categories in the profile and further store the profile in a repository (Block 108). In an embodiment the fast app module 412 may store the information in a repository that is part of a server system. In another embodiment the fast app module may implement cloud storage to save the profile. In still another embodiment, the fast app module may store the data in a memory of a client device. A profile may be stored in any of the above manners, alone or in combination.

Once the profile is stored, the system may receive an indication that the profile is to be transmitted (Block 109). The received indication may include instructions detailing how the profile should be transmitted. For example, the indication may include one or more methods for transmitting the profile, as discussed in greater detail below. Further, the indication to transmit a profile may include specific categories from the profile that are to be transmitted. In another embodiment, the indication may include formatting instructions for transmitting data from the profile.

In some embodiments, the indication to transmit the profile will include instructions to transmit the profile based on a configuration selected by the intended recipient. For example, if the intended recipient is a property manager, the property manager may select to receive profile information within a certain time period, certain categories, etc. Further, the configuration selected by the intended recipient may include formatting guidelines and/or other rules regarding how the profile should be presented upon transmission.

In an embodiment, the fast app module 412 may transmit the profile in response to a request from an intended recipient. Upon receiving the profile request, the module 412 may prompt a user for authorization prior to transmitting the profile. In still another embodiment, the fast app module can post the profile as a wanted ad in a specialized network, where property managers can view the profile and offer housing to the renter. When transmitting a profile, the fast app module may configure the data based on preferences of the renter sending the profile or by the preferences of the party receiving the profile.

The system may then transmit the profile to the intended recipient (Block 110). The fast app module may transmit the entire profile or only a portion, depending on the embodiment. In an embodiment, the fast app module may send the profile to a fax machine and/or a printing device to create a physical copy of the profile. In another embodiment, the fast app module may transmit the profile in an email. In still another embodiment, the fast app module may transmit a link to a web page where an interactive profile can be viewed. In another embodiment, the fast app module can provide a renter with a unique PIN, the renter can then share the PIN which can be used to access the profile through a webpage. In another embodiment the fast app module may transmit the profile information to a file such as a portable document format (PDF) or a Microsoft Word document and save the file locally on a client device.

Figure 2A:
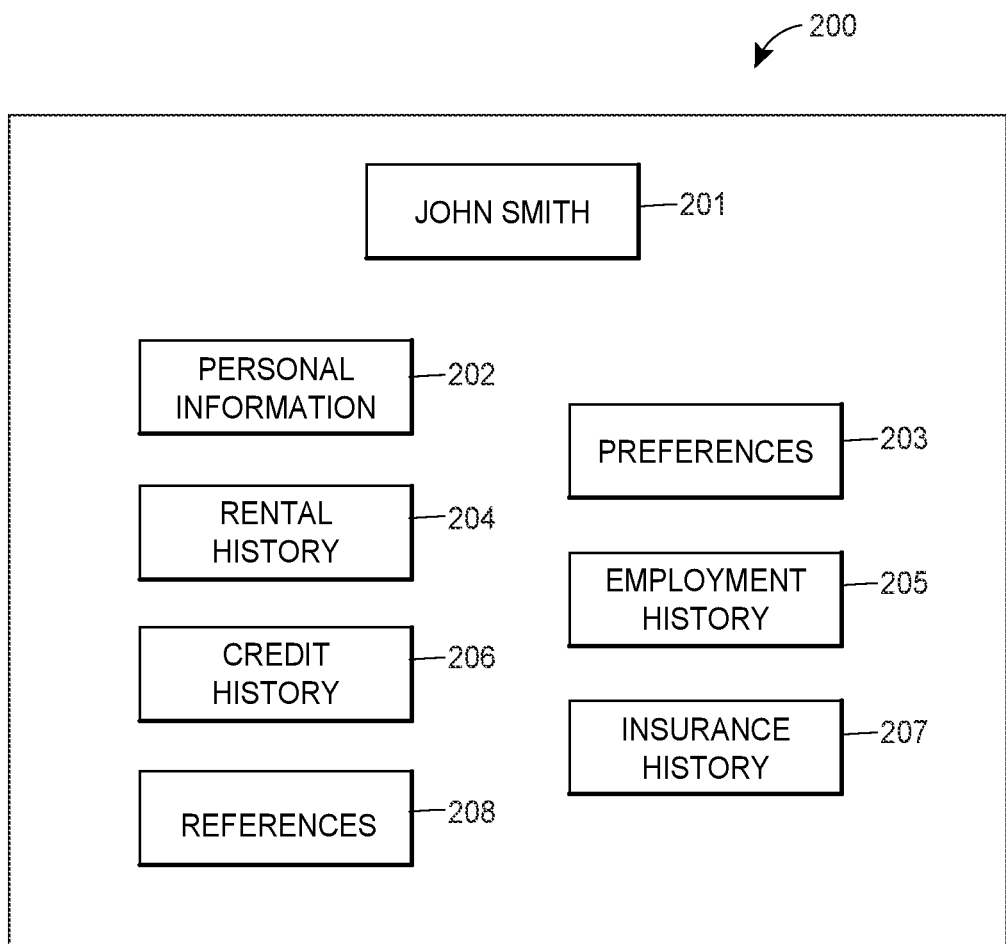
FIG. 2a is an illustration of an example user interface for a renter using the fast rental application.

FIG. 2a is an illustration of an exemplary interface 200 displaying a renter's profile in the fast application system. The example interface 200 is a home screen of a profile and can be used to access the different data elements of a profile 419a. A renter may click on any of the icons to access the particular section of the profile 419a. Once a renter has accessed a particular section, the renter may add, edit or delete information in that section. The renter can add information by entering text or adding photos, images or audio files to the section.

The profile 419a may include categories such as username 201, personal information 202, preferences 203, rental history 204, employment history 205, credit history 206, insurance history 207 and references 208. The username 201 corresponds with the login and unique profile 419a. Depending on the embodiment, the username 201 may be a renter's real name or a username created for the fast app.

Personal information 202 corresponds to demographic and personal information corresponding to the renter. For example, personal information can include a date or birth, social security number, current address, or any other important identification or demographic information.

Preferences 203 relate to criteria related to living conditions. For example, in the preferences 203, a renter may indicate if they want a roommate, if they are a smoker, if they have a pet, what floor they want to live on, the square footage they are looking for in a rental, whether they prefer a house or apartment, etc. The preferences are not limited by the preferences listed above and can include any information that may be useful in selecting housing.

The rental history 204 can include current and previous addresses of a renter. FIG. 2b is an illustration of an example user interface for a rental history page 250 of the fast rental application. Rental history 250 can also include various information for each residence of the renter. For example, for each address 252 the data may include rental fees 256, monthly rent 254, payment records 266, deposits 254, dates occupied 260. Rental history 204 may also store documents related to rental residences such as rental leases 264 and payment receipts 264. The renter can implement the icons 268 and/or 270 to add additional properties or to upload documents.

Further, rental history may also include a renter's rating 262 of a previous property. The ratings 262 of residences can be stored in a database for other renters to view. In one embodiment the rating 262 can be a numerical score. In another embodiment the rating 262 can be a star rating. In another embodiment the ratings can include information about the particular apartment, building or property manager.

Referring back to FIG. 2a, employment history 205 can include information for all previous and current employment of a user. For each job, employment history 205 may include data such as length of employment, salary, benefits, etc. Credit history 206 can include data related to a user's personal credit. Credit history 206 can include data related to credit cards that a user has or had. Credit history 206 can also include data related to a user's credit score.

A profile 419a can also include insurance history data 207. Insurance history 207 can include any insurance policies, past or present, corresponding to the profile. Insurance history 207 can include any type of insurance (home, auto, life) owned by the user. The profile 419a may also include references 208. The references 208 can include any contact such as a current or former employer, teacher, relative, associate, etc. that a user would like to provide to a property manager. The references 208 can include names, phone numbers, emails, and other information related to each contact.

Figure 3A:
FIG. 3a is an illustration of an example user interface of a property view for a property manager using the fast rental application.

FIG. 3a is an illustration of an example user interface of a property view for a property manager using the fast rental application. A property manager may be any person or entity that rents residential dwellings. For example, a property manager can be a home owner, a building manager, a real estate agent, a leasing agent etc. Further, a residential dwelling can include any property that is managed by a property manager and suitable for a person to rent and to live in. For example, a residential dwelling can be a home, a condo, an apartment, etc. In some embodiments, the fast rental app can be used by a property manager in the application process for renting other properties such as offices, mobile homes, commercial space, etc.

A property manager implementing the fast rental application may have different needs from a renter and thus the interface may appear differently for a property manager. For example, the example interface 300 includes a building identifier 302, links to apartments located in the building 304 and an option to add additional apartments to the building 306. Although the example interface 300 only includes one building and a limited number of apartments, the interface may be modified to include any number or properties or apartments. Further, a main page may exist which allows a property manager to toggle between one or more buildings or apartments.

Figure 3B:
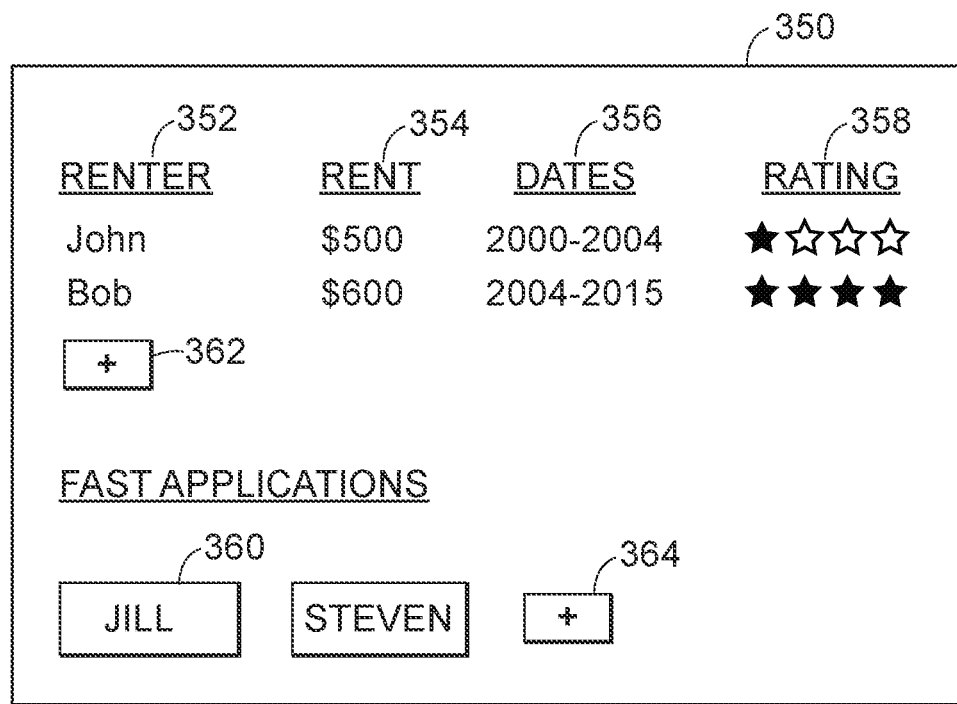
FIG. 3b is an illustration of an example user interface for an apartment view for property manager using the fast rental application.

FIG. 3b is an illustration of an example user interface for an apartment view for property manager using the fast rental application. The interface 350 may be displayed if a property manager selects an apartment icon 304 from interface 300, for example. The interface 350 may display various information related to an apartment such as previous renters 352, monthly rent 354, dates rented 356, and renter ratings 358. The ratings 358 may be stored in a database and accessed by other property managers to see ratings of potential renters. Further, the interface 350 may provide the property manager with the ability to add additional renters via icon 362.

The interface 350 may also include links to received profiles 360. The received profiles may have been transmitted via the system discussed above with respect to Block 110 of FIG. 1. Further, the interface 350 may provide the property manager with an icon 364 to request a profile. In some embodiments the icon 364 may be used to request particular profiles. In other embodiments the icon 364 may be implemented to automatically advertise a vacant apartment.

FIG. 4 generally illustrates one embodiment for a system 400 to create and maintain a fast rental application. The system 400 includes hardware and software applications, as well as various data communication channels for facilitating data communications between the various hardware and software components. The system 400 may include clients 436, 438, 440, 442, 444 and 446 as front end components and backend components 404 in communication with each other via a communication link 406 (e.g., computer network, internet connection, etc.).

FIG. 4 illustrates a block diagram of a high-level architecture of a fast application system 400 including various software or computer-executable instructions and hardware components or modules that may employ the software and instructions for a fast application. The various modules may be implemented as computer-readable storage memories containing computer-readable instructions (i.e., software) for execution by a processor of the computer system 400. The modules may perform the various tasks associated with a fast application, as herein described. The computer system 400 also includes both hardware and software applications, as well as various data communications channels for communicating data between the various hardware and software components.

The client devices 436-446 may include, by way of example, a tablet computer 436, a cell phone 438, a personal digital assistant (PDA) 440, a mobile device smart-phone 442 also referred to herein as a "mobile device," a laptop computer 444, a desktop computer 446, a portable media player (not shown), a wearable computing device (not shown), smart watches, phablets, other smart devices, devices configured for wired or wireless RF (Radio Frequency) communication, etc. Of course, any client device appropriately configured may interact with the fast app system 400. The client devices 436-446 need not necessarily communicate with the network 406 via a wired connection. In some instances, the client devices 436-446 may communicate with the network 406 via wireless signals 450 and, in some instances, may communicate with the network 406 via an intervening wireless and/or wired device 448, which may be a wireless router, a wireless repeater, a base transceiver station of a mobile telephone provider, etc.

Each of the client devices 436-446 may interact with the data system 416 to receive web pages and/or server data from the server 420 and may display the web pages and/or server data via a client application and/or an Internet browser (described below). For example, the mobile device 442 may display a profile 419a through a client application and/or through a web page to a user, may receive an input from the renter and/or property manager, and may interact with the data system 416. It will be appreciated that although only one server 420 is depicted in FIG. 4, multiple servers 420 may be provided for the purpose of distributing server load, serving different web pages, etc. These multiple servers 420 may include a web server, an entity-specific server (e.g. an Apple® server, etc.), a server that is disposed in a retail and/or proprietary network, etc.

The fast app module 412 may create profiles 419a and cause the profiles 419a to be stored in a profile repository 419. Generally, each profile 419a is a data structure including information corresponding to of a user of the fast application system and the data structure includes a plurality of data to be stored for the user. Generally, profiles include various data (such as rental history, employment history, personal info, etc.) which may be received through client devices 436-446 and through customer data 418a and other data 418b.

The clients may contain a GUI 410 which may communicate with the system 416 through the network 406 or other type of suitable network (local area network (LAN), a metropolitan area network (MAN), a wide area network (WAN), a mobile, a wired or wireless network, a private network, a virtual private network, etc.). The digital network 406 may be a proprietary network, a secure public Internet, a virtual private network and/or some other type of network, such as dedicated access lines, plain ordinary telephone lines, satellite links, combinations of these, etc. Where the digital network 406 comprises the Internet, data communication may take place over the digital network 406 via an Internet communication protocol.

A system server 420 may send and receive information and data 418a, 418b, 419 for the system 400 such as computer-executable instructions and data associated with applications executing on the clients 436-446 (e.g., the fast app module 412). The applications executing within the system 400 may include cloud-based applications, web-based interfaces to the data system 416, software applications executing on the clients, or applications including instructions that are executed and/or stored within any component of the system 400. The applications, GUI 410, browser, and module 412 may be stored in various locations including separate repositories and physical locations.

In some embodiments, the data system 416 in general and the server 420 in particular may include computer-executable instructions 422 stored within a memory 424 of the server 420 and executed using a processor 426. The instructions 422 may instantiate a fast app module 412 or send instructions to the clients 436-446 to instantiate a GUI 410 for the tool 412 using a web browser application of a client. In some embodiments, the browser application, GUI 410, fast app module 412, and elements of the data system 416 may be implemented at least partially on the server 420 or clients 436-446. The data system 416 and processor 426 may execute instructions 422 to display the GUI 410 including the data 418*a*, 418*b*, 419 within a display of the clients 436-446 or server 420 (not shown). For simplicity, only one GUI 410 is provided in the exemplary system 400, although this is not intended to limit the number and/or location of the GUI 410.

The fast app module 412 may include the functionality of a camera, or have access to camera functionality of the client devices 436-446. Thus, the module 412 may be able to take a digital photo or digital video of an item to obtain data for creating profiles. The module 412 may also receive an image of an item from the memory of the client devices 436-446. For example, the module 412 may receive a photo of a signed lease agreement to store under the rental history category of a profile 119*a*.

The fast app module 412 may include various instructions for execution by a processor 426 to create and maintain profiles 419*a*. For example, the module 412 may create profiles 419*a* by analyzing data obtained from an image of an item along with customer data 418*a*, other data 418*b*, and data from the listing repository 419. Further, the module 412 may implement one or more of optical character recognition (OCR) technology, QR code scanning and/or bar-code scanning to obtain data from the image of an item.

The fast app module 412 may then transmit the one or more profiles 419*a*. The fast app module may be implemented to send profiles to a printer so that a physical copy of the profile can be created in shared. In another embodiment, the fast app module 412 can be implemented to transmit a profile 419*a* electronically via email. In yet another embodiment the module 412 can be used to transmit the profile 419*a* to a file to be stored on the client device. The fast app module 412 can be used to transmit a complete profile or only a portion of a profile, depending on a renter and/or property manager preference.

The fast app module 412 may also include various instructions for execution by a processor 426 to set an alarm. For example, the module 412 may send a monthly reminder for a user to pay rent. The module 412 may also send reminders indicating that a lease will soon expire.

In an aspect, the module 412 may be a client application that may be implemented as a series of machine-readable instructions for performing the various tasks associated with implementing the fast application system 400 as well as receiving information, displaying information, and/or transmitting information between devices 436-446 and server 420. In an embodiment, the fast application module 412 can communicate with specialized rental application software implemented by a property manager.

In various aspects, the module 412 may be implemented as a stand-alone system or as a system wherein the front-end components 436-446 communicate with back-end components 404 as described herein. Additionally, the module 412 may include machine-readable instruction for implementing a user interface to allow a user to input commands to and receive information from the fast application system 400 in accordance with the functionality supported by the module 412.

The module 412 may be a native web browser, such as Apple's Safari®, Google Android™ mobile web browser, Microsoft Internet Explorer® for Mobile, Opera Mobile™, that may be implemented as a series of machine-readable instructions for receiving, interpreting, and displaying web page information from the server 420 or other back-end components 404 while also receiving inputs from the user. The module 412 may include an embedded web browser that may be implemented as a series of machine-readable instructions for receiving, interpreting, and displaying web page information from the servers 420 or other back-end components 404 within client devices 436-446.

In an aspect, module 412 may be an application that is installed on devices 436-446. For example, the fast app module 412 may be downloaded and installed to device 442 by a renter and/or property manager. In an aspect, module 412 may include instructions for implementing a user interface to allow a renter and/or property manager to input commands and/or respond to prompts. For example, module 412 may allow a renter to input information (personal information, preferences, etc.) or a user login, take and submit pictures of a document, input other data regarding a profile, and transmit a profile, etc.

In the various aspects described herein, client devices 436-446, and/or server 420 may facilitate creating, storing and transmitting renter profiles for a fast application. Additionally or alternatively, these aspects may provide other benefits relating to the technical operation of client devices 436-446, server 420 and/or the storage devices associated therewith.

For example, by transmitting a profile based on a received indication, the present aspect advantageously may perform transmitting pertinent data in a quick, accurate, and efficient manner.

More specifically, the module 412 may receive and analyze new data, for example, in real-time or at least near-real time using various techniques as described above to determine the category of the data, the accuracy of the data, etc., which may be used to complete renter profiles. By contrast, traditionally a renter would manually fill out each rental application, which can be cumbersome and difficult to complete based on what information is needed. Therefore, by utilizing the module 412, a renter may streamline the apartment hunting process, saving time and energy.

Also, by transmitting profiles in real-time or at least near real-time policyholders may be alerted of potential missing data or other information necessary to complete a rental application. For example, a property manager may require two references while a renter's profile only includes one. In this scenario, the renter can be immediately alerted of the deficiency and quickly complete the missing profile information.

Furthermore, by implementing a profile repository 419 and fast app module 412, the system saves valuable bandwidth and memory resources. The system is designed to efficiently store and transmit renter's profiles. This helps to free up local memory on client devices and further reduces processing time, bandwidth traffic and battery consumption.

Additionally, because the module 412 can transmit profiles in a variety of formats, including complete or partial profiles. The system is advantageously designed to transmit profiles based on the needs of the renter, property manager, and/or intended recipient. In turn, the system reduces the burden on the renter by automatically customizing how the profile is transmitted to satisfy the needs of the property manager.

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 406, may include but is not limited to any combination of a LAN, a MAN, a WAN, a mobile, a wired or wireless network, a private network, or a virtual private network. Moreover, it is understood that any number of client computers or display devices are supported and can be in communication with the data system 404.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, which may be one of an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or more processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors). These operations are accessible via a network (e.g., the Internet) and via one or more appropriate interfaces (e.g., application program interfaces (APIs)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or an "algorithm" or a "routine" is a self-consistent sequence of operations or similar processing leading to a desired result. In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 400 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for a fast application through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method, the computer-implemented method comprising:

receiving, at a backend server via a computer network, a login corresponding to a profile in a profile repository, wherein each profile includes first data corresponding to a user associated with the profile and a plurality of categories, and wherein the plurality of categories includes at least personal information, rental history, and employment history;

receiving, at the backend server by one or more processors, second data corresponding to the user associated with the profile from one or more search databases;

automatically determining, at the backend server by one or more processors, categories of the plurality of categories to which the second data belongs using a trained machine learning algorithm;

retrieving, at the backend server by one or more processors, the first data from one or more databases;

generating, at the backend server by one or more processors, updated user data corresponding to the user associated with the profile based upon at least the first data and the second data, wherein generating the updated user data includes updating one or more categories of the plurality of categories based on the determined categories;

storing, at the backend server, at least the updated user data in the profile; and updating, at the backend server, a rental application based on at least the updated user data.

2. The computer-implemented method of claim 1, further comprising:

receiving a request for the rental application corresponding to the user associated with the profile from a client device of a property manager;

transmitting the request for the rental application corresponding to the user associated with the profile to a client device corresponding to the user associated with the profile;

receiving an indication that the request is accepted via the client device corresponding to the user associated with the rental application; and transmitting the rental application to the client device of the property manager responsive to receiving the indication that the request is accepted.

3. The computer-implemented method of claim 1, further comprising:

verifying, by one or more processors, that the second data corresponds to the user associated with the profile.

4. The computer-implemented method of claim 1, further comprising:

determining, by one or more processors, that the profile is missing data required by a property manager; and transmitting, by one or more processors, a request for the missing data to the one or more search databases;

wherein the second data includes the missing data.

5. The computer-implemented method of claim 1, further comprising:

determining, by one or more processors, that the profile is missing data required by a property manager; and causing, by one or more processors, a client device corresponding to the user associated with the profile to display an indication of the missing data to the user.

6. The computer-implemented method of claim 1, wherein determining the categories of the plurality of categories includes:

analyzing the second data using one or more of QR code scanning, bar-code scanning or computer speech recognition.

7. The computer-implemented method of claim 1, the categories of the profile can further include one or more of credit history, insurance history, references or preferences.

8. The computer-implemented method of claim 1, further comprising transmitting a display interface including generating a private identification number to access the profile.

9. A computer-system application system, the computer-system comprising:

a first client device corresponding to a user, and a data server including one or more processors and one or more memories, the one or more memories including instructions executed on the one or more processors to:

receive, from the first client device via a computer network, a login corresponding to a profile in a profile repository, wherein each profile includes first data corresponding to a user associated with the profile and a plurality of categories, and wherein the plurality of categories includes at least personal information, rental history, and employment history;

automatically determine categories of the plurality of categories to which second data belongs using a trained machine learning algorithm;

retrieve the first data from one or more databases;

generate updated user data corresponding to the user associated with the profile based upon at least the first data and the second data, wherein generating the updated user data includes updating one or more categories of the plurality of categories based on the determined categories;

store, at the data server, at least the updated user data in the profile; and update, at the data server, a rental application based on at least the updated user data.

10. The computer-system of claim 9, wherein the one or more memories include further instructions to:

receive a request for the rental application corresponding to the user associated with the profile from a second client device corresponding to a property manager;

transmit the request for the rental application corresponding to the user associated with the profile to the first client device corresponding with the user associated with the profile;

receive an indication that the request is accepted via the first client device corresponding to the user associated with the rental application; and transmit the rental application to the second client device corresponding to the property manager responsive to receiving the indication that the request is accepted.

11. The computer-system of claim 9, wherein the one or more memories include further instructions to:

verify that the second data corresponds to the user associated with the profile.

12. The computer-system of claim 9, wherein the one or more memories include further instructions to:

determine that the profile is missing data required by a property manager; and transmit a request for the missing data to one or more search databases;

wherein the second data includes the missing data.

13. The computer-system of claim 9, wherein the one or more memories include further instructions to:

determine that the profile is missing data required by a property manager; and cause the first client device to display an indication of the missing data to the user.

14. The computer-system of claim 9, wherein the categories of the profile further include one or more of credit history, insurance history, references, or preferences.

15. The computer-system of claim 10, wherein determining the categories of the plurality of categories includes:

analyzing the second data using one or more of QR code scanning, bar-code scanning, or computer speech recognition.

16. The computer-system of claim 9, wherein the one or more memories include further instructions to: transmit a display interface including generating a private identification number to access the profile.

17. A non-transitory, computer-readable medium storing instructions that specifically configure one or more processors of a computer system such that, when executed by one or more processors, the instructions cause the computer system to:

receive a login corresponding to a profile in a profile repository, wherein each profile includes first data corresponding to a user associated with the profile and a plurality of categories, and wherein the plurality of categories includes at least personal information, rental history, and employment history;

receive second data corresponding to the user associated with the profile from one or more search databases;

automatically determine categories of the plurality of categories to which the second data belongs using a trained machine learning algorithm;

retrieve the first data from one or more databases;

generate updated user data corresponding to the user associated with the profile based upon at least the first data and the second data, wherein generating the updated user data includes updating one or more categories of the plurality of categories based on the determined categories;

store at least the updated user data in the profile; and update a rental application based on at least the updated user data.

18. The non-transitory, computer-readable medium of claim 17, further storing instructions to:
verify that the second data corresponds to the user associated with the profile.

19. The non-transitory, computer-readable medium of claim 17, further storing instructions to:
determine that the profile is missing data required by a property manager; and
transmit a request for the missing data to the one or more search databases;
wherein the second data includes the missing data.

20. The non-transitory, computer-readable medium of claim 17, further storing instructions to:
determine that the profile is missing data required by a property manager; and
cause a client device corresponding to the user associated with the profile to display an indication of the missing data to the user.

* * * * *